July 30, 1940.  E. J. DEISLEY  2,209,563
VEHICLE BODY CONSTRUCTION
Filed Aug. 3, 1937  3 Sheets-Sheet 1
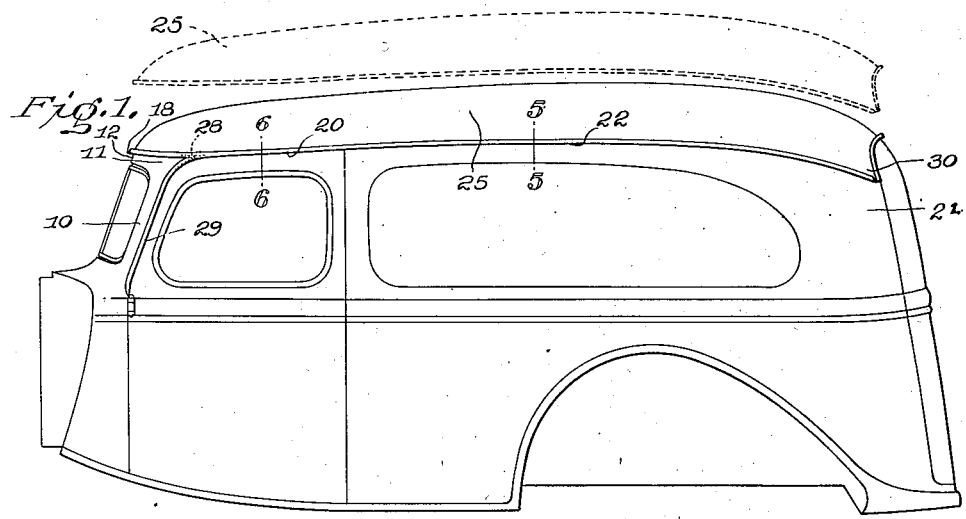
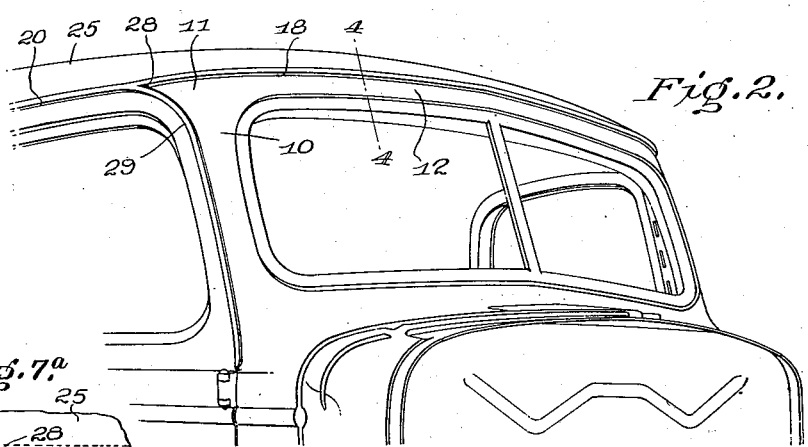
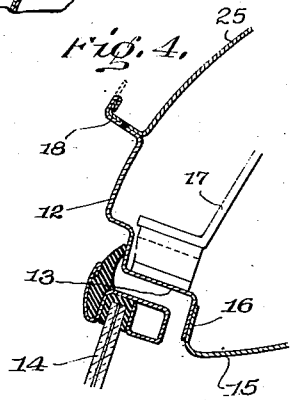
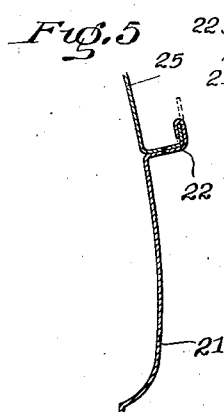
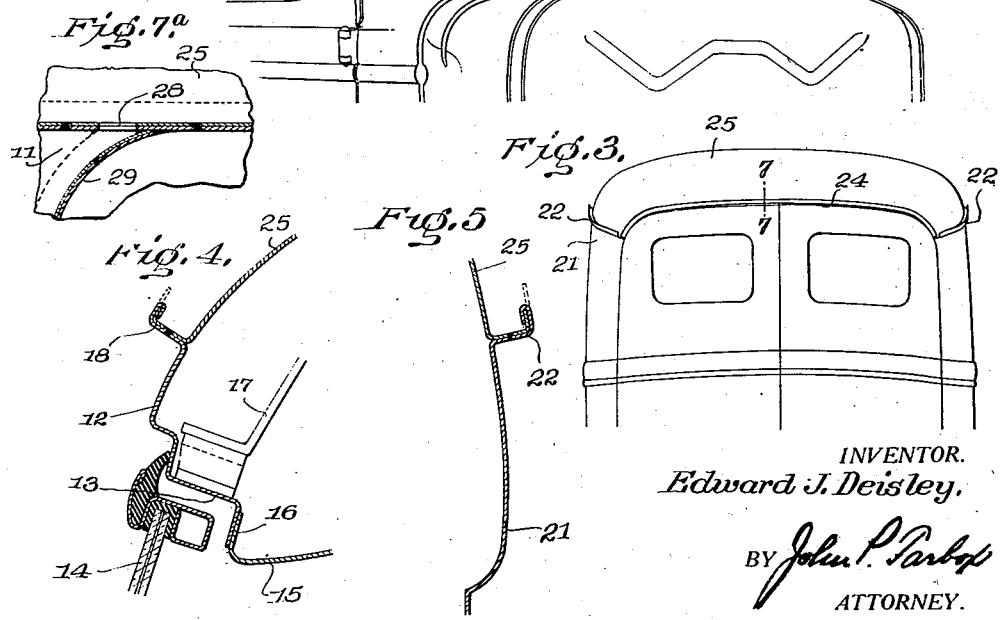
INVENTOR.
Edward J. Deisley,
BY John P. Tarbox
ATTORNEY.

July 30, 1940.  E. J. DEISLEY  2,209,563
VEHICLE BODY CONSTRUCTION
Filed Aug. 3, 1937  3 Sheets-Sheet 2
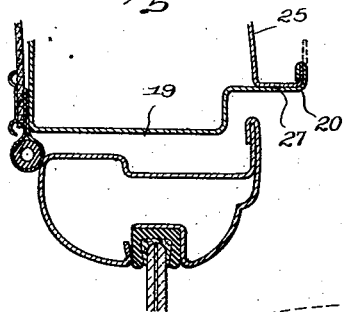
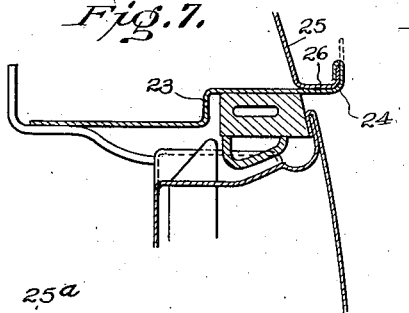
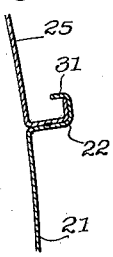
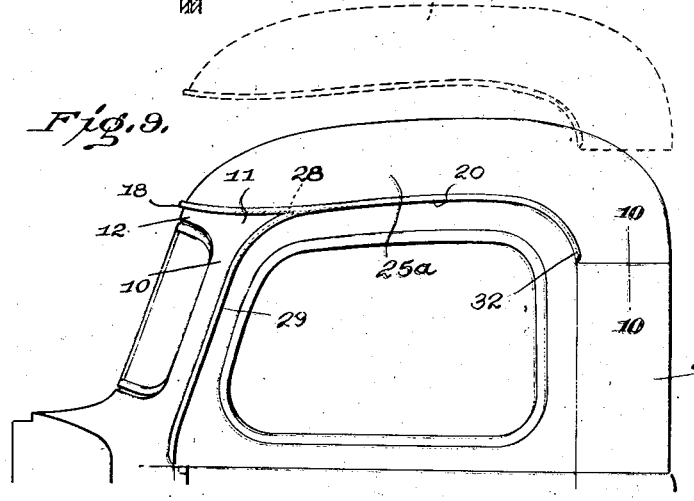
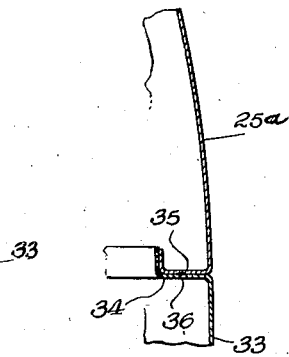
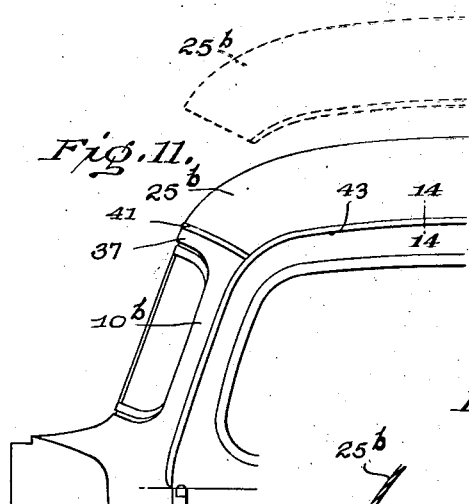
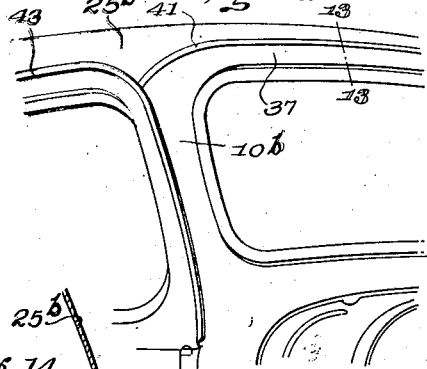
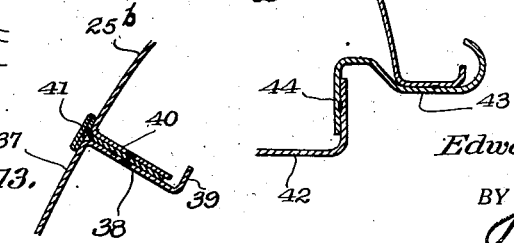
INVENTOR.
Edward J. Deisley
BY John P. Tarbox
ATTORNEY.

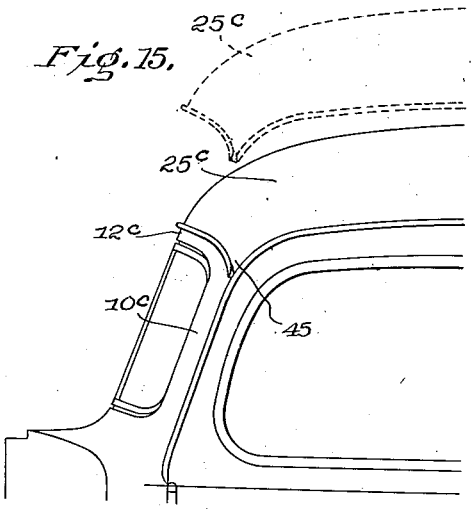
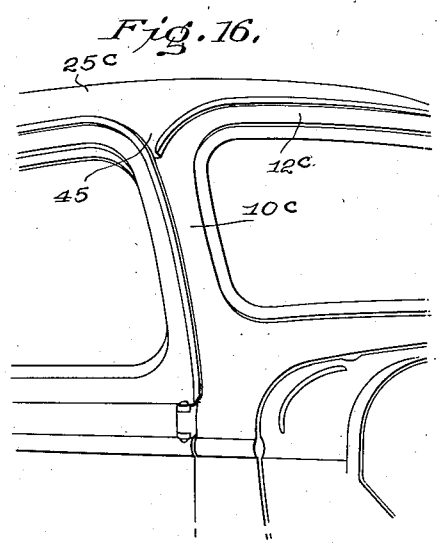
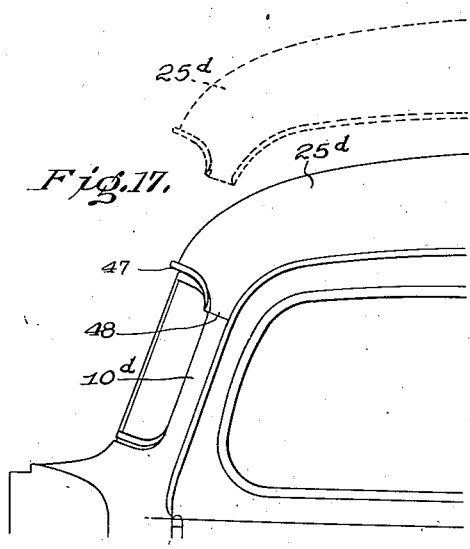
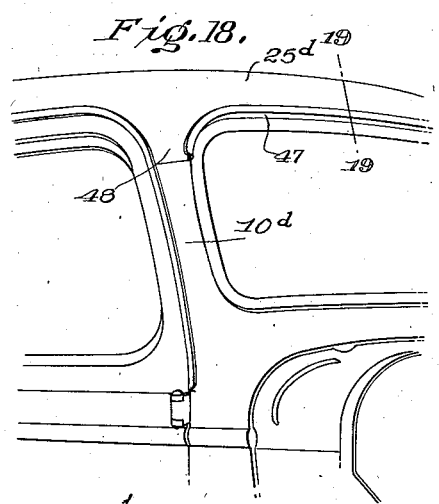
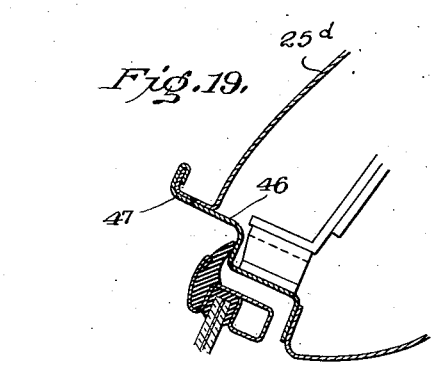
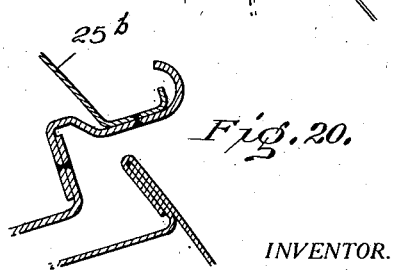
INVENTOR.
Edward J. Deisley
BY
ATTORNEY.

Patented July 30, 1940

2,209,563

UNITED STATES PATENT OFFICE 2,209,563

VEHICLE BODY CONSTRUCTION

Edward J. Deisley, Detroit, Mich., assignor to Edward G. Budd Manufacturing Company, Philadelphia, Pa., a corporation of Pennsylvania Application August 3, 1937, Serial No. 157,082

4 Claims. (Cl. 296—28)

This invention relates to closed vehicle bodies and more particularly to the roof construction of such bodies.

It is an object of the invention to simplify the joinder of the roof unit to the side and end walls and thereby reduce the costs of manufacture and assembly.

It is a further object of the invention to simplify the construction and manner of application of the drip molding at the margins of the roof, the construction being such as to facilitate the assembly of the parts in the final assembly.

These objects are attained by terminating the side and end walls of the body above the closure openings therein, such as window and door openings, and in forming the margins of said walls with final assembly joint formations, preferably of angle or channel form, and in constructing the roof unit as a separate subassembly panel stamping having its marginal portion given formations complemental to the final assembly joint formations on the side and end wall units, so that when the roof unit is brought down upon the side and end wall units, it may be readily joined throughout by simple spot welding operations. The greater portion and, in some cases, the entire marginal portions of the side and end walls and the roof are so formed that the final assembly joint also completes a drip molding structure at the margin of the roof. In regions where a drip molding is not desired, the parts may be joined through adjacent inwardly extending overlapping flanges and where desired, the joint may be covered by a molding strip inserted between the flanges and secured thereto.

Other and further objects and advantages and the means by which they are attained, will become apparent from the following detailed description when read in connection with the accompanying drawings.

In the drawings:

Fig. 1 shows the inventions as applied to a closed delivery truck type of body having a door opening in its rear wall, the body being shown in side elevation and the roof unit being shown in full and in dotted lines, the dotted line position indicating the roof unit in position to be brought down for joinder in final assembly to the side and end walls.

Fig. 2 is a partial perspective view, as seen from the front, of the body shown in Fig. 1.

Fig. 3 is a partial rear end elevation of the body shown in Fig. 1.

Fig. 4 is a sectional view on an enlarged scale taken substantially along the line 4—4 of Fig. 2.

Figs. 5 and 6 are similar sectional views taken substantially, respectively, along the lines 5—5 and 6—6 of Fig. 1.

Fig. 7 is a corresponding sectional view taken substantially along the line 7—7 of Fig. 3.

Fig. 7a is a detail view showing the drainage opening between the generally horizontal drip channel at the margin of the roof and the downwardly inclined drip channel along the door opening.

Fig. 8 is a sectional view similar to Fig. 5 but showing a slight modification of the joint.

Fig. 9 is a view similar to Fig. 1 but showing only the upper part of the body, the invention in this case being applied to a closed cab type of body.

Fig. 10 is an enlarged sectional view taken substantially along the line 10—10 of Fig. 9.

Fig. 11 is a side elevation of the upper front end of the body, of either of the types shown in Figs. 1 or 9, showing a slight modification.

Fig. 12 is a partial front perspective view of the body shown in Fig. 11.

Fig. 13 is a detail sectional view taken substantially along the line 13—13 of Fig. 12 and Fig. 14 is a similar view taken substantially along the line 14—14 of Fig. 11.

Fig. 15 is a view similar to Fig. 11 of a still further modification.

Fig. 16 is a partial front perspective view of the body shown in Fig. 15.

Fig. 17 is a view similar to Fig. 11 showing a still further modification.

Fig. 18 is a partial front perspective view of the body shown in Fig. 17.

Fig. 19 is a detailed sectional view taken substantially along the line 19—19 of Fig. 18, and Fig. 20 is a partial sectional view through the rear joint of a closed delivery truck type of body according to the modifications shown in Figs. 11 to 14 inclusive, the section corresponding to that section indicated by the line 7—7 of Fig. 3.

According to the embodiment shown in Figs. 1 to 7a, the body side and end walls are preferably formed of panel stampings extending in the front above the windshield opening and terminating at sides and front along a line approximately at the level of the top of the front door. The A-post portion 10 of the body front is inclined rearwardly to correspond with the rearwardly inclined windshield and terminates at the top in a rearwardly extending angular side portion 11. The top margin of this front portion extends from the door opening on one side to the door opening on the opposite side of the body and is slightly raised at the central portion so that it slopes slightly toward the sides where it joins the top rail extending over the door opening. The rear top margin of the sides is inclined downwardly and extends to the margin of the rear door opening where it joins the top rail over the rear door opening which is also arched transversely.

The top margin of the front wall extending from doorway opening to doorway opening, is formed by an outer transverse panel 12 having formed in it at the top of the windshield opening, the rabbet 13 for receiving the top edge of the windshield 14. It terminates in the windshield opening in a downwardly extending flange to which an inner finish panel 15 is spot welded to its upwardly extending flange 16. The top of the windshield frame is reinforced by an inner transverse reinforce 17 extending from side to side and joined to the side rails in a manner well known in the art. The upper margin of the front panel 12 is formed with an upwardly and inwardly facing angle 18, the outer arm of which, prior to the final assembly, being indicated by the dotted lines in Fig. 4.

Over the side doorway opening, the side wall terminates in an upwardly presenting channel shape header 19 having its outer wall formed with an upwardly and inwardly facing angle 20, similar to the angle 18, the position of the outer arm of the angle being indicated, prior to the final assembly, by the dotted lines in Fig. 6. Rearwardly of the doorway opening, the angle 20 of the header 19 is extended to the margin of the rear doorway opening by the top margin of the side panel 21. In Fig. 5, the angular margin of this panel is designated 22 and its position prior to final assembly, as again indicated by the dotted lines. The top margin of the rear wall is formed by an angular header 23, see Fig. 7, extending from side to side of the body and bowed transversely to conform to the shape of the top of the rear door opening. This angular header is also formed in its outer margin with an upwardly and inwardly facing angle 24, the position of the outer arm of which, prior to final assembly, is again indicated by the dotted lines.

From this description, it may be seen that a substantially continuous upwardly and inwardly facing angular formation is provided entirely around the top of the front, side and rear walls above the closure openings therein.

This angular formation provides a convenient final assembly joint structure for the attachment of the roof panel stamping in the final assembly.

The roof panel, indicated by the reference character 25, is preferably a unitary stamping, as shown, or several stampings welded together forming a unitary panel structure. The roof panel is formed with the marginal upwardly facing channel 26 providing a final assembly joint structure arranged to be brought down to nest with the upwardly facing angle at the margin of the side and end walls in the final assembly. It can be readily secured thereto by a line of spot welds 27 as by moving a pinch welding tool along the overlap. To give the joint a neat appearance and to further strengthen it, the margin of the outer arm of the angle on the side and end wall units is finally bent over the upwardly extending flange of the margin of the roof panel from the dotted line position to the full line position as clearly shown in Figs. 4, 5, 6 and 7. This also has the advantage of making the joint weather proof.

It will be seen that a joint so formed, provides a drip channel extending entirely around the margin of the roof. To facilitate the drainage of the water from this drip channel, at the low spot just forwardly of the rear end of the front post panel 11, the bottom of the channel is provided with a drainage opening 28 shown most clearly in the detail view in Fig. 7a through which the water from the upper generally horizontally extending drip channel may drain into the downwardly inclined drip channel 29 extending along the inclined rear margin of the A-post and emerging at the top with the horizontal drip channel. At the point 30 where the drip channel across the rear door opening meets the drip channel extending along the sides, these channels are both inclined downwardly and there is a slight spacing between them to permit the water from both channels to drain therefrom.

By this construction, the drainage from the roof is provided for in very simple fashion by means entering into the final assembly joint structure and fabrication of the body is thereby facilitated.

According to the modification shown in Fig. 8, the angle 22 at the top of the side panel 21 has its outer arm turned down in the final assembly as shown at 31 but partially so that it extends horizontally. This same construction could obviously be employed throughout the joint between the roof and the side and end units. It has the advantage that it may be more easily formed and presents an appearance substantially the same as that shown in the figures previously discussed.

In the construction disclosed in Figs. 9 and 10, where the invention is applied to a closed cab type of body, the drip channel forming the joint between the roof 25a and side and end walls terminates in a downwardly inclined portion 32 at the rear margin of the door opening and the rear panel 33 terminates at the top in an upwardly presenting angle 34 substantially in the plane of the rear downturned end of the drip channel 32. This angular formation extends from side to side from door opening to door opening and the roof panel 25a in this region is formed with an inner upwardly facing channel 35 which nests with the angle 34 and is secured thereto by the spot welds 36, the outer face of the roof panel 25a being flush with the outer face of the rear panel 33.

According to the construction shown in Figs. 11, 12, 13, 14 and 20, the drip molding is omitted in the joint between the front wall and the roof 25b. In this case, the joint across the body above the windshield extending from door opening to door opening is formed by flanging the top of the front panel 37 first inwardly at 38 and then upwardly at 39 and bringing the inwardly flanged front margin 40 of the roof panel 25b in overlapping relation with the flange 38 and spot welding these flanges together. Preferably, in order to hide the joint, the metal molding 41 is first inserted between the flanges 38 and 40 and, in the final assembly, the three overlapping thicknesses of metal are spot welded together. At the sides, with this construction as with the preceding constructions, the drip molding extends through the inclined portion of the front post 10b rearwardly over the door opening and, in the case of the commercial truck type of body, around the rear end of the body over the rear door opening.

In the side header region over the door opening, the final assembly joint construction may be that shown in Fig. 14 where numeral 42 represents the angular header having an upwardly extending flange in its outer margin to which a separate drip channel strip 43 is attached through a downwardly extending flange 44 on its inner margin, this flange 44 overlapping the upwardly extending flange of the header 42 and being spot welded thereto. The roof panel 25b with its upwardly facing channel margin is in the final assembly merely brought down to rest at the bottom of the drip channel 43 and spot welded to it. The outer wall of the drip channel 43 is preferably curved to give it a pleasing appearance. In the case of the commercial truck type of body, the joint across the rear door opening shown in Fig. 20 corresponds to the construction over the side door opening shown in Fig. 14. In the case of this commercial truck type of body, the side wall rearwardly of the door opening, would naturally have its upper margin formed to conform with the shape of the drip channel 43 through the door opening.

According to the construction shown in Figs. 15 and 16, the front lateral portions of the roof 25c are formed with downwardly extending pointed portions 45 and the drip channel across the front wall portion 12c formed in the final assembly joindure of the front wall and the roof stamping is correspondingly downturned at the sides to meet the drip channel extending through the inclined A-post region 10c and extending rearwardly through the side wall region, and to drain thereto. The specific form of the joints according to this modification may correspond to anyone of the forms already described.

According to the construction shown in Figs. 17 and 18, the joint is made directly above the windshield header panel 46 which, as shown in Fig. 19, terminates just above the windshield opening in an upwardly and inwardly facing angle 47 to which the roof panel 25d is joined in the manner disclosed in Fig. 4. According to this construction, the drip channel across the front terminates at the side of the windshield opening and the joint between the roof panel 25d and the post phase 10d may be a simple lap joint as indicated at 48.

In all of these various modifications, the objects and advantages set forth at the beginning of this specification are in large measure obtained. It will be understood, of course, that further changes and modifications may be made by those skilled in the art without departing from the spirit and scope of the appended claims.

What I claim is:

1. In a closed vehicle body having door openings, a front wall extending to a point above the windshield opening and terminating in an angular formation in its margin extending from side to side substantially to said door openings on the opposite side of the body, and side walls terminating above the door openings in channel formations, a roof unit stamping having a front inwardly extending marginal flange and side outwardly extending marginal flanges arranged to overlap and be spot welded, respectively, to the angular and channel formations of the side and front walls and form at least with the side walls drip channels.

2. A vehicle body construction comprising an inclined windshield pane and a front door post correspondingly inclined in the windshield region, a lateral drip channel extending through a substantial portion of said inclined post region upwardly and through a smooth curve rearwardly over the door opening, and a drip channel extending transversely of the body above and spaced from the upper margin of said windshield pane, said transversely extending channel terminating adjacent to said lateral drip channel, whereby a Y-shaped arrangement of the drip channels at the upper front corner of the body is created.

3. A vehicle body construction comprising a front end wall including an inclined windshield and terminating above said windshield and a front door post correspondingly inclined in the windshield region, a lateral drip channel extending through a substantial portion of said inclined post region upwardly and through a generous curve rearwardly over a door opening in the body side wall, and a drip channel extending transversely of the body above the windshield to a point adjacent said lateral drip channel, said transverse and lateral drip channels forming a part of final assembly joints between the front end wall, the said wall and a roof stamping forming the greater portion of the roof of the body, said channels and final assembly joints being substantially arranged in the form of a Y in the region of the upper front corner of the body.

4. In a vehicle body, a roof panel, two adjacent margins of this roof panel being downwardly curved and merging also by a generous curve into each other, drip channels provided along the lower edges of both said roof margins, the adjacent ends of the two drip channels being spaced from each other in the region where the two margins merge into each other, as to provide for a water outlet at the corner of the body.

EDWARD J. DEISLEY.